(12) United States Patent
Bratina et al.

(10) Patent No.: US 8,518,147 B2
(45) Date of Patent: Aug. 27, 2013

(54) METAL SEPARATION USING A TUNNEL KILN FURNACE

(75) Inventors: James E. Bratina, Greenwood, IN (US); Anthony Kriech, Indianapolis, IN (US); Shannon Wilson, Indianapolis, IN (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 282 days.

(21) Appl. No.: 12/844,431

(22) Filed: Jul. 27, 2010

(65) Prior Publication Data

US 2012/0024111 A1 Feb. 2, 2012

(51) Int. Cl.
*C22B 4/00* (2006.01)

(52) U.S. Cl.
USPC .............................. 75/401; 209/11

(58) Field of Classification Search
USPC .......................................................... 75/401
See application file for complete search history.

(56) References Cited

U.S. PATENT DOCUMENTS

| | | | |
|---|---|---|---|
| 1,511,194 A | 10/1924 | Austin | |
| 2,393,467 A | 1/1946 | Hanak | |
| 2,403,419 A | 7/1946 | Wilkins et al. | |
| 3,556,500 A * | 1/1971 | Fritz et al. ..................... | 266/137 |
| 3,632,094 A | 1/1972 | Longenecker | |
| 3,669,644 A | 6/1972 | Sato | |
| 3,776,718 A | 12/1973 | Leak et al. | |
| 4,123,294 A | 10/1978 | Hanink | |
| 4,203,985 A | 5/1980 | Yelnosky et al. | |
| 4,227,922 A | 10/1980 | Laws et al. | |
| 5,619,934 A * | 4/1997 | Yen .............................. | 110/235 |
| 5,735,933 A | 4/1998 | Yokoyama et al. | |
| 6,024,226 A | 2/2000 | Olivier | |
| 6,682,586 B2 * | 1/2004 | Frame et al. .................... | 75/658 |
| 2007/0180955 A1 | 8/2007 | Warner | |
| 2007/0264151 A1 | 11/2007 | Cho et al. | |
| 2009/0236268 A1 | 9/2009 | Shulman | |

* cited by examiner

*Primary Examiner* — George Wyszomierski
*Assistant Examiner* — Tima M McGuthry Banks
(74) *Attorney, Agent, or Firm* — Brinks Hofer Gilson & Lione

(57) ABSTRACT

A method of separating metals that are physically or structurally combined in assemblies which includes the steps of: providing at least one assembly that comprises two or more different metals that are physically or structurally combined; heating the at least one assembly in a tunnel kiln furnace to melt at least one of the different metals while maintaining at least one of the different metals in a solid state; and separating the at least one of the different metals that was melted from the at least one of the different metals that was maintained in the solid state. According to one embodiment the assemblies are "copper meatballs." Also disclosed is a system for separating metals that are physically or structurally combined in assemblies which system includes a tunnel kiln furnace and processing containers or processing containment assemblies into or onto which the assemblies are loaded and transported through the tunnel kiln furnace in.

11 Claims, 5 Drawing Sheets

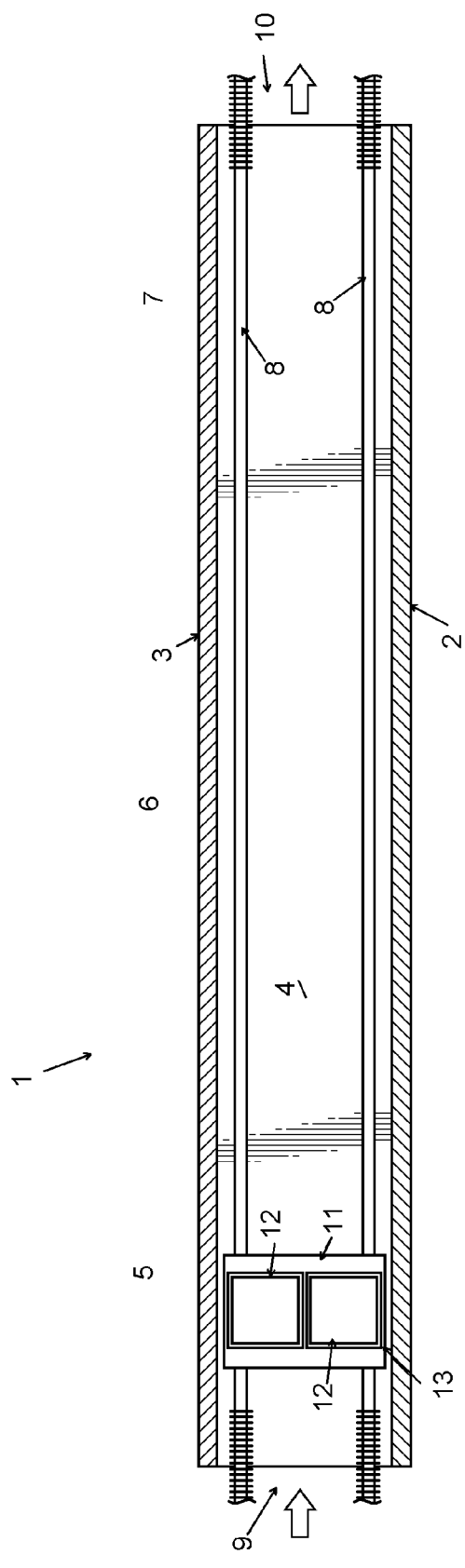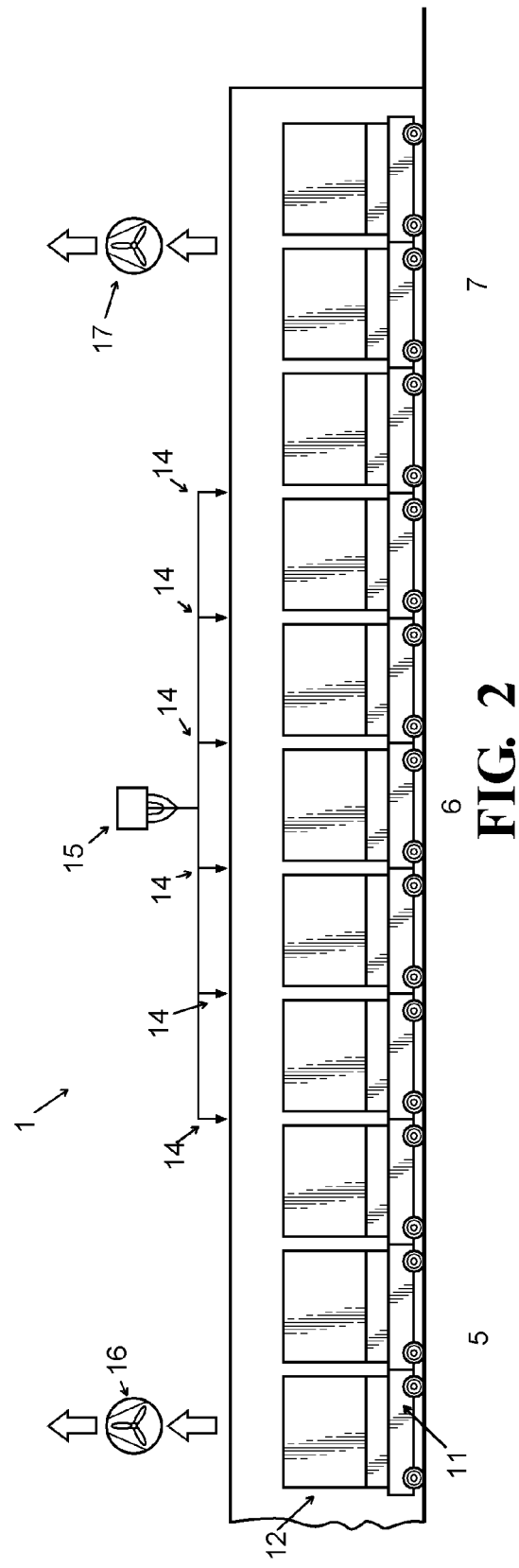

METAL SEPARATION USING A TUNNEL KILN FURNACE

BACKGROUND

The present invention relates generally to methods and systems for separating metals from articles and assemblies, including electrical components, in which two or more different metals are physically or structurally combined. In particular the present invention is directed to a method of using a tunnel kiln furnace to separate metals from various articles and assemblies.

Metal wastes which are desired to be recycled can include materials, articles, assemblies and/or components that comprise physical or structural mixtures or combinations of two or more different metals. These mixtures or combinations of different metals can be difficult to separate using conventional techniques such as physical mechanical or manual separation. While the individual materials, if separated, can have a high commercial value, the mixed or combined materials generally have a significantly lower commercial value.

"Copper meatball" is the term given to copper wound electrical components of automobiles by automobile recyclers. "Copper meatballs" that are recovered from automobile shredding operations and motor vehicle scrapping operations and include motor armatures, field cores, transformers and similar electrical components. These "copper meatballs" are also known as "SHELMO" within the ferrous shred industry and have relatively low value. If the copper and iron could be economically separated from "copper meatballs" the value will be increased significantly. However to date no economical process exists to separate the copper and iron from "copper meatballs." In fact one current manner of separating the copper and iron from "copper meatballs" involves shipping them to low employment wage counties where workers manually separate the copper and iron by hand.

In the United States alone there are more than 10 million tons of automobiles that are shredded annually. The shredding of these automobiles produces an estimated 20 to 25 pounds of "copper meatballs" per automobile. The result is that more than 100,000 tons of "copper meatballs" are available for recycle every year. The ratio of copper to iron in "copper meatballs" can vary; however, a conservative estimate of 10% copper in "copper meatballs" means there will be more than 10,000 tons of copper available for recovery annually. This represents a significant potential value.

The separation of materials or articles that are comprised of two or more metals will be proportionally challenging based on how tightly the two or more metals are physically or structurally combined. In the case of "copper meatballs" copper wire is typically wound tightly around the iron core of electrical components such as motor armatures, field cores, transformers, and the like. Since the physical separation of these materials is very costly, the current practice for shredder companies is to sell the "copper meatballs" at a fraction of the value of the individual copper and iron components. The physical separation of materials is possible, but is very time consuming.

U.S. Pat. No. 3,776,718 to Leak et al. discloses a process to recover copper and steel from scrap which is rather complicated in that it requires that the scrap first be treated with a chemical reagent such as sodium sulfates and silicates, then dried and then immersed in a molten medium such as a salt, slag or glass.

The present invention provides a method that separates copper from the iron in "copper meatballs" by melting the copper and leaving the iron as a solid material. Such a simple selective melting of the lower melting metal according to the present invention is much more effective and economical to perform than previous separation methods.

BRIEF SUMMARY

According to various features, characteristics and embodiments of the present invention which will become apparent as the description thereof proceeds, the present invention provides a method of separating metals that are physically or structurally combined in assemblies which method involves the steps of:

a) providing at least one assembly that comprises two or more different metals that are physically or structurally combined;

b) heating the at least one assembly in a tunnel kiln furnace to melt at least one of the different metals while maintaining at least one of the different metals in a solid state; and c) separating the at least one of the different metals that was melted from the at least one of the different metals that was maintained in the solid state.

The present invention further provides a system for separating metals that are physically or structurally combined in assemblies which system comprises:

at least one processing containment assembly including a base, a support position over the base to support a plurality of articles or assemblies that comprise two or more different metals that are physically or structurally combined and a shield that is configured to be supported on the support and shield articles or assemblies supported on the support; and a furnace in which the at least one processing container and assemblies loaded therein can be heated to a temperature sufficient to melt at least one of the different metals while maintaining at least one of the different metals in a solid state, whereby metal melted from the articles or assemblies can flow through the support and into the base.

According to one embodiment of the present invention the at least one assembly comprises a physical or structural combination of one of: copper and iron; aluminum and iron; and aluminum and copper.

According to one embodiment the assemblies from which different metals are recovered from automobile shredding operations and/or a scrapping operation and can include motor armatures, field cores, transformers and similar assemblies.

BRIEF DESCRIPTION OF THE DRAWINGS

The present invention will be described with reference to the attached drawing which is given as non-limiting example only, in which:

FIG. 1 is a top cross sectional view of a tunnel kiln furnace according to one embodiment of the present invention.

FIG. 2 is a side schematic view of the interior of a tunnel kiln furnace according to one embodiment of the present invention with kiln carts in the tunnel kiln furnace.

DETAILED DESCRIPTION OF THE DRAWINGS AND THE PRESENTLY PREFERRED EMBODIMENTS

Figure 3:
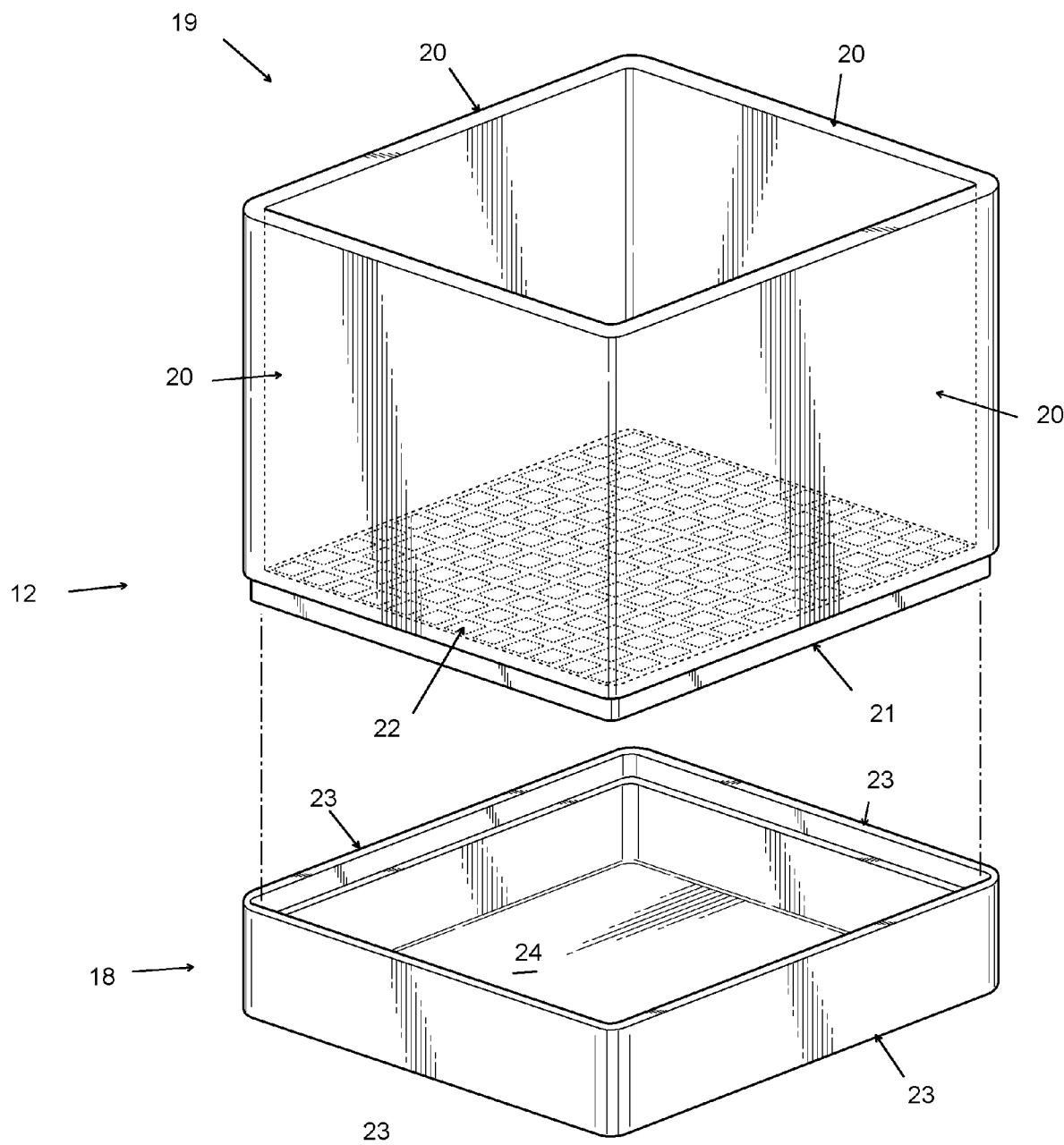
FIG. 3 is a perspective view of a processing container according to one embodiment of the present invention.

The present invention relates generally to methods and systems for separating metals from articles and assemblies, including electrical components, in which two or more different metals are physically or structurally combined. In particular the present invention is directed to a method of using a tunnel kiln furnace to separate metals from various articles and assemblies.

While the present invention is described herein with reference to "copper meatballs" and the separation or copper from iron, it is to be understood that the use of a tunnel kiln furnace to separate different metals from articles and assemblies, including electrical components according to the present invention can be used to separate two or more different metals from other types of articles and assemblies, including other combinations of metals.

The process of the present invention uses a tunnel kiln furnace for the separation of two metals with different melting points. The process upgrades the value of the separate metals over their physically or structurally combined state value. The separation is accomplished using the difference in the melting points of the metals.

FIG. 1 is a top cross sectional view of a tunnel kiln furnace according to one embodiment of the present invention. The tunnel kiln furnace used according to the present invention is basically an elongated furnace that has a number of different temperature zones including a preheating zone, one or more heating zones and a cooling zone.

As depicted in FIG. 1 the kiln tunnel furnace 1 includes side walls 2 and 3, a bottom 4, and a top (not shown). The tunnel kiln furnace 1 depicted in FIG. 1 includes a preheating zone 5, a heating zone 6 and a cooling zone 7. A pair of tracks or rails 8 extends along the bottom 4 of the kiln tunnel furnace 1 from the entrance 9 of the furnace to the exit 10.

According to the present invention kiln carts 11 are transported along the pair of tracks or rails 8 by a conventional drive means (not shown) from the entrance 9 to the exit 10. In this regard, the kiln carts 11 are provided with wheels or other conventional means which can cooperate with a tracks or rails to move the kiln cart 11 through the tunnel kiln furnace 1. Although one kiln cart 11 is shown in FIG. 1 it is to be understood that in operation, any number of kiln carts 11 can be passed through the tunnel kiln furnace in succession or one after another evenly or randomly spaced apart. Typically the kiln carts 11 are indexed through the kiln tunnel furnace with preceding kiln carts being pushed by subsequent kiln carts.

The kiln cart 11 in FIG. 1 is depicted as supporting two processing containers 12. The processing containers are discussed in more detail below in reference to FIGS. 3 and 4. While FIG. 1 depicts two processing containers 12 on the kiln cart 11, it is to be understood that the kiln cart 11 and/or processing containers 12 could be sized and configured so that one or more than two processing containers 12 are received on each kiln cart 11. As can be seen in FIG. 1 the interior of the tunnel kiln furnace 1 is relatively narrow so that there is just a small clearance between the sides 13 of the kiln cart 11 and the walls 2 and 3 of the furnace.

FIG. 2 is a schematic side view of the interior of a tunnel kiln furnace according to one embodiment of the present invention with a plurality of kiln carts in the tunnel kiln furnace. The tunnel kiln furnace 1 is heated by a number of burner units 14, the majority of which are located in heating zone 6. The burner units 14 depicted in FIG. 2 receive fuel from a common source 15. At opposite ends of the tunnel kiln furnace 1 are exhaust ducts 16 and 17 through which gases and vapors in the tunnel kiln furnace 1 are exhausted from the tunnel kiln furnace and sent to a bag house for collection and removal of particulates and processing.

FIG. 2 depicts are plurality of kiln carts 11 that are aligned one after another to pass through the tunnel kiln furnace 1. The processing containers 12 are positioned on the kiln carts 11. The kiln carts 11 can have flat top surfaces upon which the processing containers 12 are supported. Alternatively, the kiln carts 11 can have side walls as indicated in FIG. 1 that can be relatively short to help locate the processing containers 12 on the kiln carts 11.

FIG. 3 is a perspective view of a processing container according to one embodiment of the present invention. The processing container 12 includes a bottom reservoir 18 and an upper waste article receiver 19. The upper waste article receiver 19 is defined by a plurality of side walls 20 and a bottom 21 that is provided with a plurality of apertures 22. The bottom 21 of the upper waste article receiver 19 or bottom edges of the side walls 20 of the upper waste article receiver 19 are recessed inwardly so that the upper waste article receiver 19 can be received in the upper portion of the bottom reservoir 18 as depicted by the broken lines in FIG. 3.

The bottom reservoir 18 is defined by a plurality of side walls 23 and a solid bottom 24. Inner portions of the side walls 23 of the bottom reservoir 18 recessed outward to receive the bottom of the upper waste article receiver 19 in a nested manner.

While the processing container 12, including the upper waste article receiver 19 and the bottom reservoir 18 is depicted in FIG. 3 as having a square configuration and depicted in FIG. 1 as being rectangular, it is to be understood that the processing container 12, including the upper waste article receiver 19 and the bottom reservoir 18 can have any desired cross sectional shape including circular, or any geometric shape or non-geometric shape. It is also within the scope of the present invention to configure the upper waste article receiver 19 and the bottom reservoir 18 of the processing container 12 so that two or more processing containers 12 or two or more of the upper waste article receivers 19 can be stacked one upon another for storage or for passing through the tunnel kiln furnace 1.

FIG. 3 depicts the apertures 22 as having square cross sectional shapes and being arranged uniformly in a two dimensional array in the bottom 21 of the upper waste article receiver 19. In other embodiments the apertures 22 can have other shapes, such as for example elongated slits or any desired geometric shapes or non-geometric shapes. In further embodiments the bottom 21 of the upper waste article receiver 19 can be a grate, screen, etc. that is coupled to or, support on, the bottom 21 of the upper waste article receiver 19.

Figure 4:
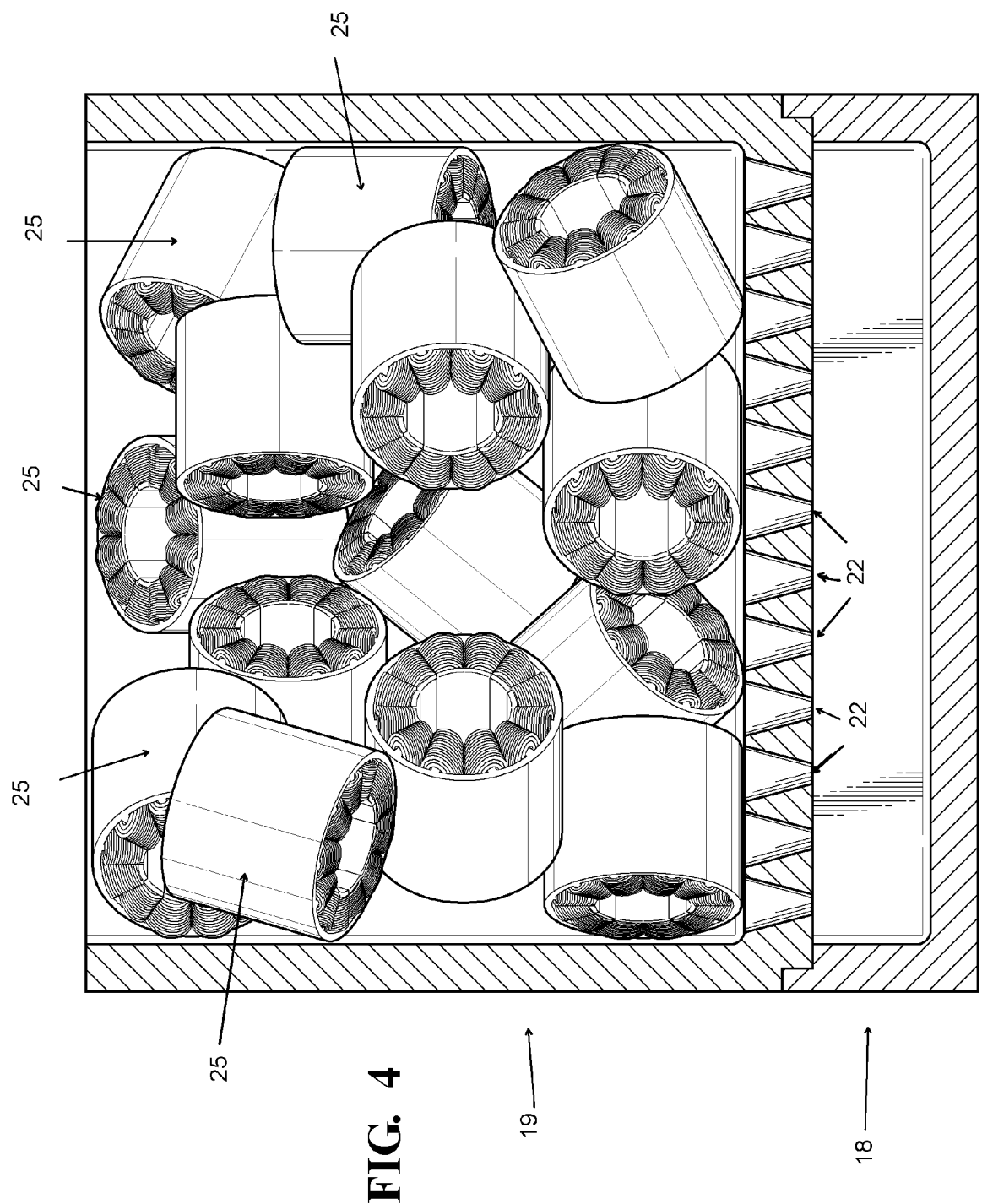
FIG. 4 is a cross sectional view of a processing container according to one embodiment of the present invention which depicts copper meatballs in the processing container.

FIG. 4 is a cross sectional view of a processing container according to one embodiment of the present invention which depicts copper meatballs in the processing container. FIG. 4 depicts how the bottom edge of the walls 20 or bottom 21 of the upper waste article receiver 19 and the upper edges of the walls 23 of the bottom reservoir 18 are configured to nest together.

FIG. 4 further depicts one embodiment of the shapes of the apertures 22 in which the walls of the apertures 22 are tapered with the upper openings of the apertures 22 is larger than the bottom openings. In other embodiments the walls of the apertures 22 can be parallel and straight.

FIG. 4 depicts a plurality of copper meatballs 25 randomly loaded into the upper waste article receiver 19 of the processing container 12.

Figure 5:
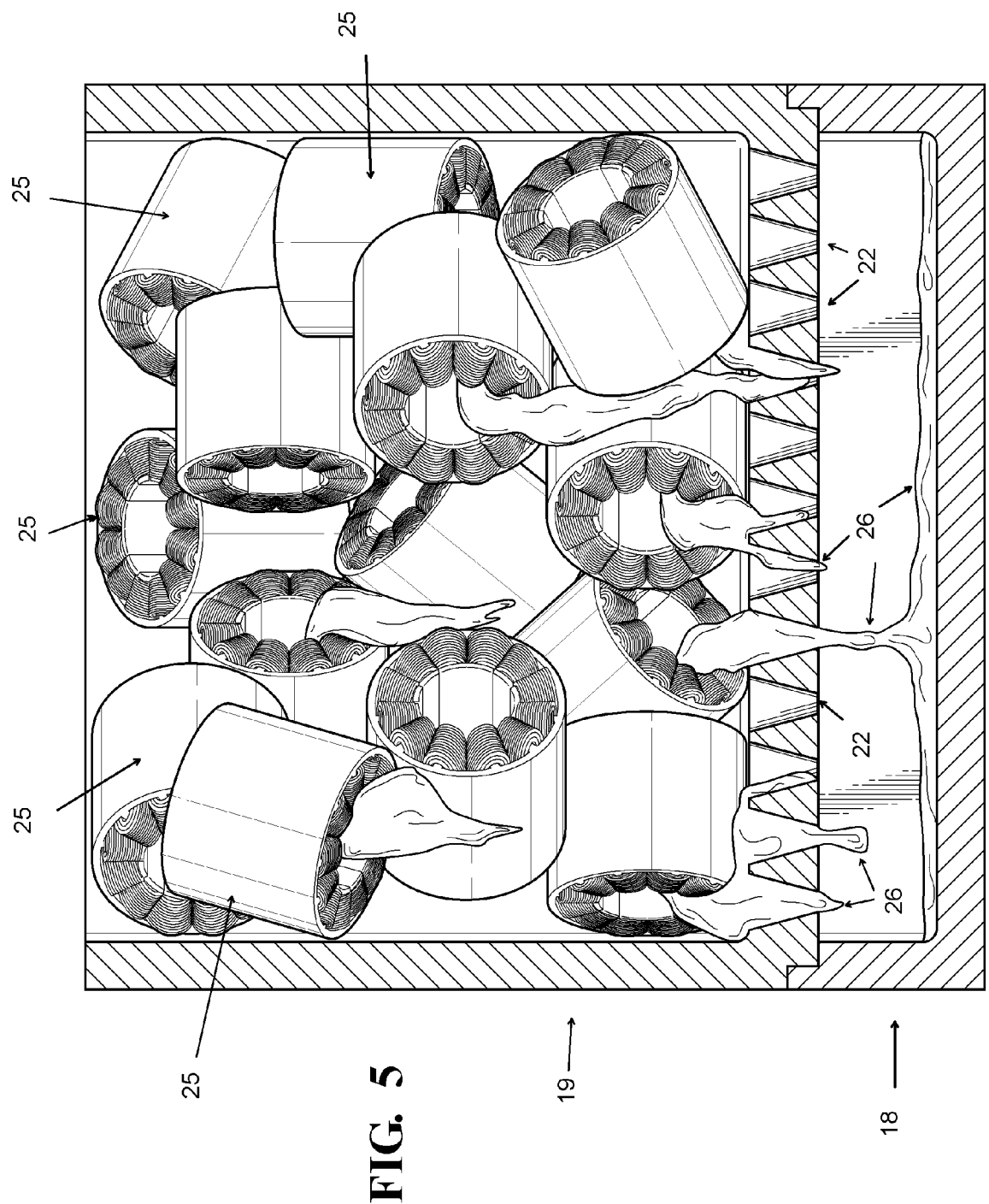
FIG. 5 is a cross sectional view of a processing container according to one embodiment of the present invention which depicts melting of copper in the copper meatballs.

FIG. 5 is a cross sectional view of a processing container according to one embodiment of the present invention which depicts melting of copper in the copper meatballs. FIG. 5 depicts how, in the case of copper meatballs 25, copper is separated from the iron by heating the copper meatballs 25 to a temperature which is above the melting point of copper and below the melting point of the iron. In FIG. 5 the molten copper is identified by reference numeral 26 and is depicted as flowing from the copper meatballs 25 and through the apertures 22 in the bottom 21 of the upper waste article receiver 19 and into the bottom reservoir 18.

The processing container 12 can be made from ceramic materials, refractory materials, high melting point metals, or any material or combination of materials that can withstand the necessary temperatures needed to perform the metal separation and which do not react with the metals of interest.

Using copper meatballs as a non-limiting example, the metal separation process of the present invention involves loading copper meatballs 25 into the upper waste article receivers 19 of processing containers 12, loading the processing containers 12 on to kiln carts 12 and passing the kiln carts 12 through a tunnel kiln furnace 1. In the tunnel kiln furnace 1 the copper meatballs 25 are heated to a temperature above the melting point of copper and below the melting point of iron. As a result, the copper is removed from the copper meatballs 25 as molten copper 26 which flows from the copper meatballs 25 and through the apertures 22 in the bottom 21 of the upper waste article receiver 19 and into the bottom reservoir 18. The separated copper can be recovered as a solid after cooling or recovered in molten form. The iron that remains after the copper has melted off can be recycled.

Figure 6:
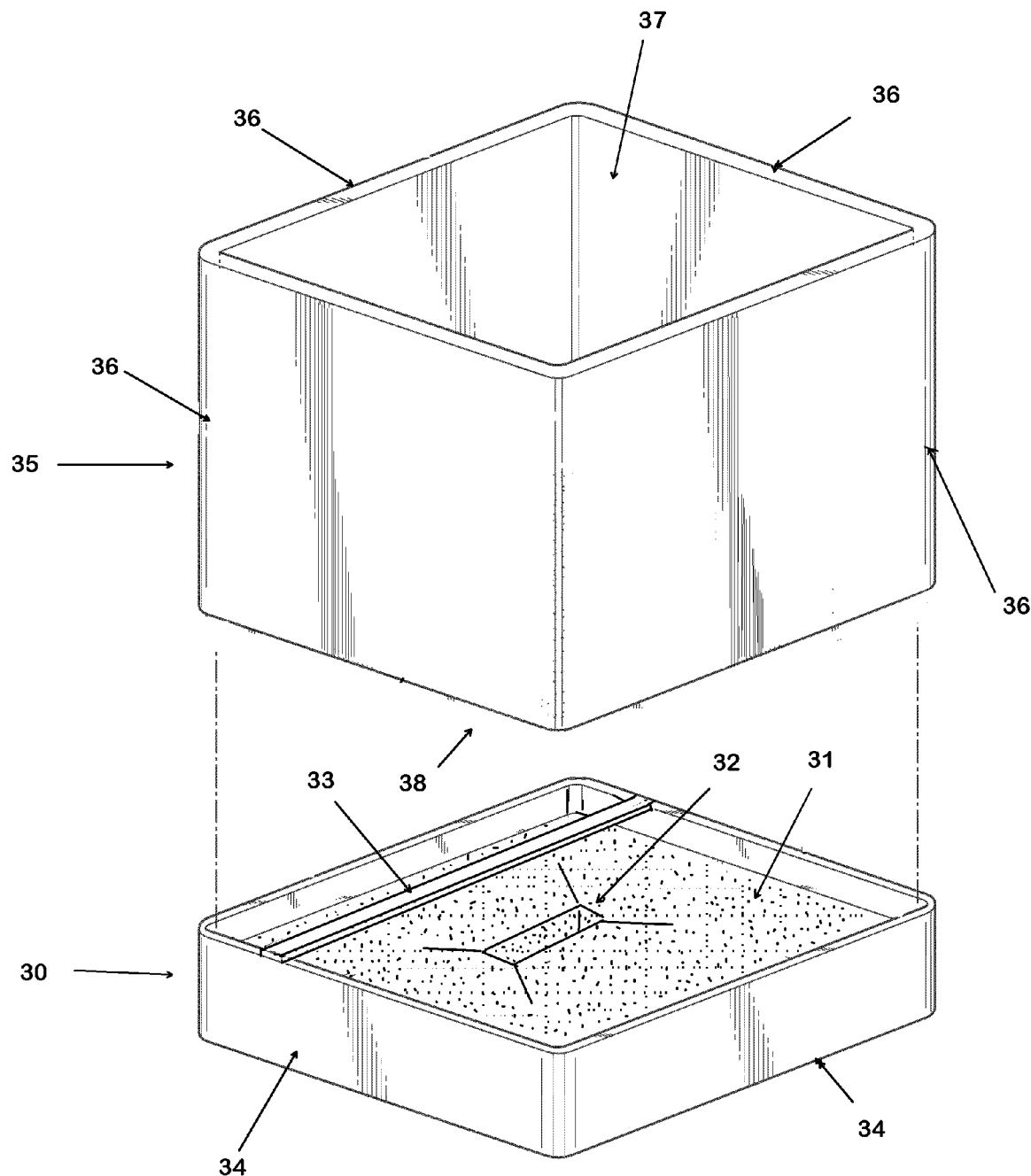
FIG. 6 is a perspective view of a processing containment assembly according to one embodiment of the present invention.

FIG. 6 is a perspective view of a processing containment assembly according to one embodiment of the present invention. In order to process the articles and assemblies according to the present invention they have to be contained in some manner, such as in the processing container 12 discussed above. According to further embodiments containment can be accomplished without the use of a container. The processing containment assembly of FIG. 6 includes a base 30 that, in the depicted embodiment contains sand 31 that is packed to form one or more ingot mold areas 32. The base 30 provides a reservoir into which molten metal can be received during the processing as discussed herein. The base 30 could be used without the packed sand 31 if desired; however the packed sand 31 allows for easy removable of collected molten metal and further allows for forming/molding the molten metal into convenient shapes.

A grate, screen, plurality of bars or rods, etc. can be placed over base so that articles and assemblies that are to be processed can be supported thereon over the top of the base 31. One bar 33 is depicted in FIG. 6, it being understood that a plurality of such bars in parallel would be used according to one embodiment of the invention. The plurality of bars (or rods) can comprise a one-piece assembly that can be placed over the top of the base 30 if desired. The grate, screen, plurality of bars or rods, etc. can rest on the tops of the side walls 34 of the base 30. Alternatively, the grate, screen, plurality of bars or rods, etc. can be supported on a ridge formed on the upper inner sides of the walls 34 or the base 30, or otherwise supported in any convenient manner.

Rather than the processing container 12 depicted in FIG. 3, the processing containment assembly of FIG. 6 includes a shield 35 that shields metals such as iron from being oxidized by the burners of the kiln tunnel furnace. The shield 35 includes a plurality of walls 36, an open top 37 and an open bottom 38. Since the shield 35 does not have to function to contain articles and assemblies placed over the base 30 (on a grate, screen, plurality of bars or rods, etc.), the shield 35 does not have to be made from a material having a high mechanical strength. Rather the shield 35 can be made from a relatively light heat resistant metal or a metal that is sufficiently durable to withstand the heat of the flames or burners in the kiln tunnel furnace. Suitable materials include metals, alloys of metals, and ceramics.

In use, the base 30 is positioned on one of the kiln carts 11. The base 30 can be empty of filled with packed sand 31 that is formed with a mold cavity 32 if desired. Next a grate, screen, plurality of bars or rods, etc. is placed over the top of the base 30. Next a number of articles or assemblies to be processed are placed on the grate, screen, plurality or bars or rods, etc. and the shield 35 is placed over on the grate, screen, plurality of bars or rods, etc. so as to surround and shield the articles or assemblies. The thus loaded kiln cart 11 is transferred into the inlet of the kiln tunnel furnace.

The use of a tunnel kiln furnace provides for the temperature that is needed to heat various metals to their melting points and further provides for the necessary temperature control to selectively melt one or more metals while maintaining others in their solid state. Any combinations of metals with melting points that are separated by a few hundred degrees Fahrenheit are suitable for the process of the present invention, including, but not limited to copper/iron, aluminum/iron and aluminum/copper. The process of the present invention does not require any other materials to be placed in the tunnel kiln furnace other than the articles, assemblies and/or components. Moreover the process of the present invention does not require any chemical pretreatment of the articles, assemblies and/or components. Preheating of the articles, assemblies and/or components in the preheating zone 5 of the tunnel kiln furnace can remove any organics, including plastics, oils, etc. and water or moisture.

The residence time over which the articles, assemblies and/or components are heated as they pass through the tunnel kiln furnace and/or the temperature in the heating zone 6 can easily be adjusted as desired to obtain a desired throughput and/or percentage recovery of a desired metal(s).

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method of separating metals that are physically or structurally combined in assemblies which method comprises the steps of:
   a) providing at least one assembly that comprises two or more different metals that are physically or structurally combined;
   b) providing a processing container and placing the at least one assembly in the processing container;
   b) passing the processing container through a tunnel kiln furnace and heating the at least one assembly in the tunnel kiln furnace to melt at least one of the two or more different metals of each of the at least one assembly while maintaining at least another one of the two or more different metals in a solid state; and
   c) separating the at least one of the two or more different metals that was melted from the at least another one of the two or more different metals that was maintained in the solid state.

2. A method of separating metals according to claim 1, wherein the at least one assembly comprises a physical or structural combination of one of: i) copper and iron; ii) aluminum and iron; and iii) aluminum and copper.

3. A method of separating metals according to claim 2, wherein the at least one assembly comprises an assembly recovered from a motor vehicle.

4. A method of separating metals according to claim 2, wherein the at least one assembly comprises at least one of a motor armature, a field core and a transformer.

5. A method of separating metals according to claim 1, further comprising preheating the at least one assembly to remove organic materials from the at least one assembly.

6. A method of separating metals according to claim 1, wherein the processing container comprises an upper portion for receiving the at least one assembly and a bottom portion for collecting the melted metal from the heating step.

7. A method of separating metals, that are physically or structurally combined in assemblies which method comprises the steps of:
  a) providing at least one assembly that comprises two or more different metals that are physically or structurally combined;
  b) providing a processing containment assembly that includes a base and a shield and placing the at least one assembly over the top of the base and positioning the shield over the base so as to surround the at least one assembly;
  c) passing the processing containment assembly through a tunnel kiln furnace and heating the at least one assembly in the tunnel kiln furnace to melt at least one of the two or more different metals of each of the at least one assembly while maintaining at least another one of the two or more different metals in a solid state; and
  d) separating the at least one of the two or more different metals that was melted from the at least another one of the two or more different metals that was maintained in the solid state.

8. A method of separating metals according to claim 7, wherein the at least one assembly comprises a physical or structural combination of one of: i) copper and iron; ii) aluminum and iron; and iii) aluminum and copper.

9. A method of separating metals according to claim 8, wherein the at least one assembly comprises an assembly recovered from a motor vehicle.

10. A method of separating metals according to claim 8, wherein the at least one assembly comprises at least one of a motor armature, a field core and a transformer.

11. A method of separating metals according to claim 7, further comprising preheating the at least one assembly to remove organic materials from the at least one assembly.

* * * * *